United States Patent [19]

Ogisu et al.

[11] Patent Number: 5,378,768

[45] Date of Patent: Jan. 3, 1995

[54] METHOD FOR SURFACE MODIFICATION OF POLYOLEFIN RESIN MOLDED ARTICLE AND METHOD FOR COATING SURFACE OF POLYOLEFIN RESIN MOLDED ARTICLE

[75] Inventors: Yasuhiko Ogisu; Mamoru Kato; Shigeyuki Takahashi, all of Aichi, Japan

[73] Assignee: Toyoda Gosei Co., Ltd., Nishikasugai, Japan

[21] Appl. No.: 174,061

[22] Filed: Dec. 29, 1993

[30] Foreign Application Priority Data

Dec. 28, 1992 [JP] Japan .................................. 4-349100
Jul. 1, 1993 [JP] Japan .................................. 5-163619

[51] Int. Cl.⁶ .............................................. C08F 8/06
[52] U.S. Cl. ................................... 525/388; 427/299; 525/333.8
[58] Field of Search .......................... 525/388; 427/299

[56] References Cited

U.S. PATENT DOCUMENTS

| 4,131,637 | 12/1978 | Bernstein et al. | 525/388 |
| 4,336,356 | 6/1982 | Aharoni et al. | 525/388 |
| 4,997,888 | 3/1991 | Sekiguchi et al. | 525/388 |
| 5,064,908 | 11/1991 | Schuster et al. | 525/388 |

FOREIGN PATENT DOCUMENTS 3103448 4/1991 Japan .

*Primary Examiner*—Bernard Lipman
*Attorney, Agent, or Firm*—Cushman, Darby & Cushman

[57] ABSTRACT

A method for modifying the surface of a polyolefin resin molded article is disclosed, comprising contacting a polyolefin resin molded article with an ozone aqueous solution to oxidize the surface of said molded article. The surface of a polyolefin resin molded article can be modified easily and uniformly whatever shape the molded article may have. Previous cleaning of the molded article with an organic solvent is unnecessary. A coating layer can be formed on the thus modified surface with high adhesion.

5 Claims, 3 Drawing Sheets

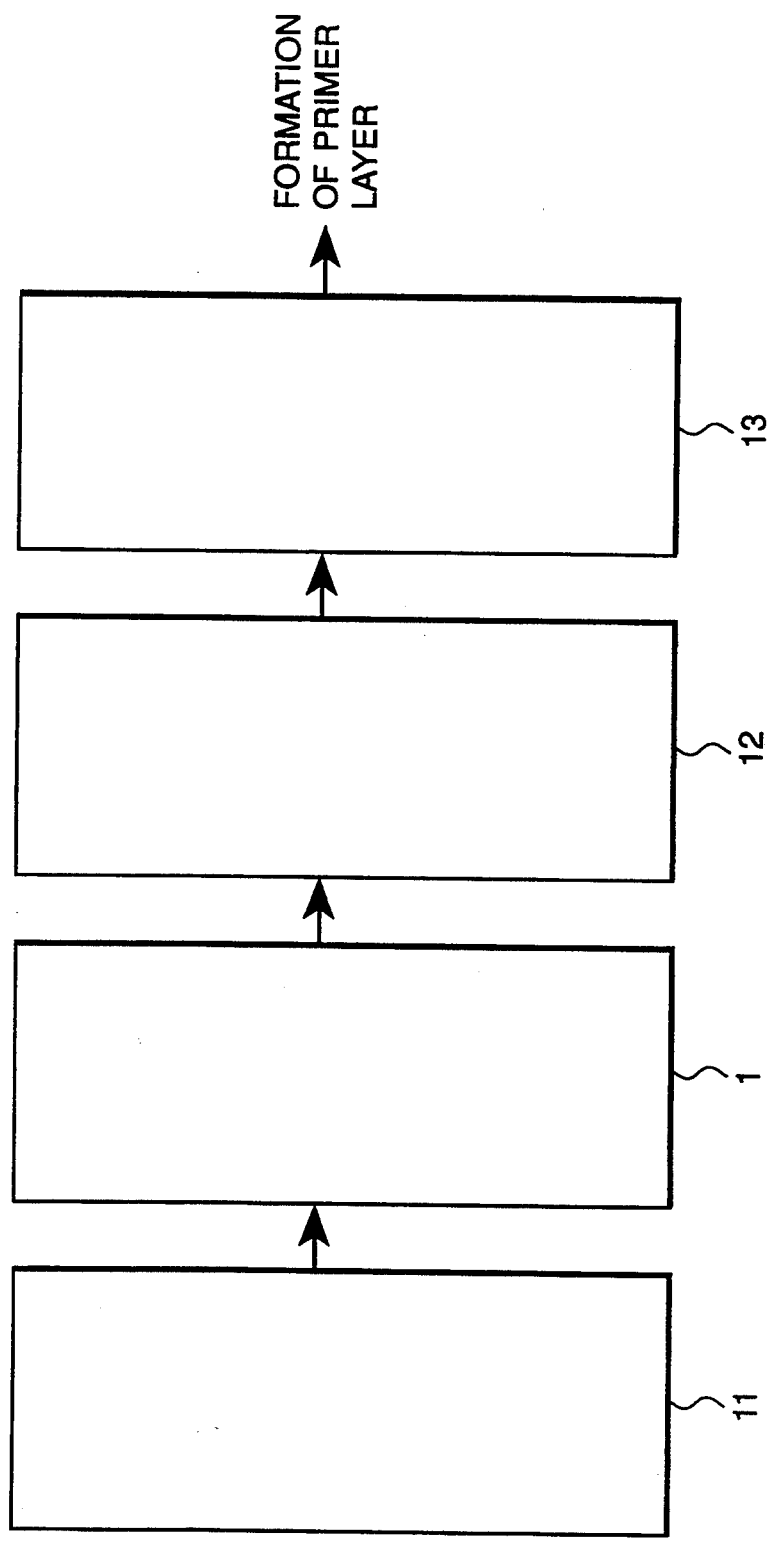

METHOD FOR SURFACE MODIFICATION OF POLYOLEFIN RESIN MOLDED ARTICLE AND METHOD FOR COATING SURFACE OF POLYOLEFIN RESIN MOLDED ARTICLE

FIELD OF THE INVENTION

This invention relates to a method for surface modification of a molded article of a polyolefin resin having relatively low surface polarity, such as polypropylene, and to a method for coating a surface of the molded article of the polyolefin resin.

BACKGROUND OF THE INVENTION

When a molded article of a polyolefin resin having relatively low surface polarity, typically polypropylene, is processed by, for example, coating, the surface of the molded article is generally cleaned with a solvent, e.g., trichloroethane prior to priming coat or plasma treatment. Cleaning with a solvent polarizes the surface of the molded article to bring about firm adhesion between the surface and the topcoating paint. However, with the recent increasing need of limiting use of an organic solvent, especially a halogenated hydrocarbon such as trichloroethane, as a cleaning agent, it has been demanded to develop a new approach for surface modification of a polyolefin resin molded article in place of solvent cleaning.

The technique disclosed in JP-A-3-103448 (the term "JP-A" as used herein means an "unexamined published Japanese patent application") is among such approaches. According to this technique, a polypropylene resin molded article is treated with an ozone stream to oxidize the surface and thereby to impart hydrophilic properties.

The problem associated with this method is that uniform modification of all the surface of a resin molded article cannot be achieved without difficulty. That is, in order to modify the surface uniformly, an ozone stream must be applied to all the surface uniformly while equalizing the time of application on every part of the surface. Therefore, where a resin molded article to be treated has a complicated shape, either the molded article or an ozone stream should be moved properly. Otherwise, all the surface of the molded article cannot be modified uniformly, ultimately resulting in a failure of uniform coating.

Besides, the above method still requires cleaning of the surface of a molded article prior to the surface modification to remove any contaminant such as organic substances. The method therefore involves use of an organic solvent for cleaning and, at least, requires an additional step for cleaning.

SUMMARY OF THE INVENTION

An object of the present invention is to provide a method for modifying the surface of a polyolefin resin molded article easily and uniformly without use of an organic solvent, thereby making it possible to form a coating layer on the molded article with high adhesive strength.

Another object of the present invention is to provide a method for coating a surface of a polyolefin resin molded article with high adhesion.

The present invention relates to a method for modifying the surface of a polyolefin resin molded article which comprises contacting a polyolefin resin molded article with an ozone aqueous solution to oxidize the surface of said molded article.

In a preferred embodiment of the above method, said contacting is carried out under such conditions that the product of the temperature of the ozone aqueous solution (T; ° C.) multiplied by the contact time (C; min) (T×C) is not less than 450.

In another preferred embodiment of the above method, the ozone aqueous solution has a temperature of 40° to 70° C. and a pH of not more than 7.

The present invention also relates to a method for coating the surface of a polyolefin resin molded article which comprises contacting a polyolefin resin molded article with an ozone aqueous solution to oxidize the surface of said molded article and then forming a coating layer on the thus obtained surface-modified polyolefin resin molded article either directly or via a primer layer.

BRIEF DESCRIPTION OF THE DRAWINGS

FIG. 5 is a schematic illustration of a series of apparatus used in Example 2.

DETAILED DESCRIPTION OF THE INVENTION

Figure 1:
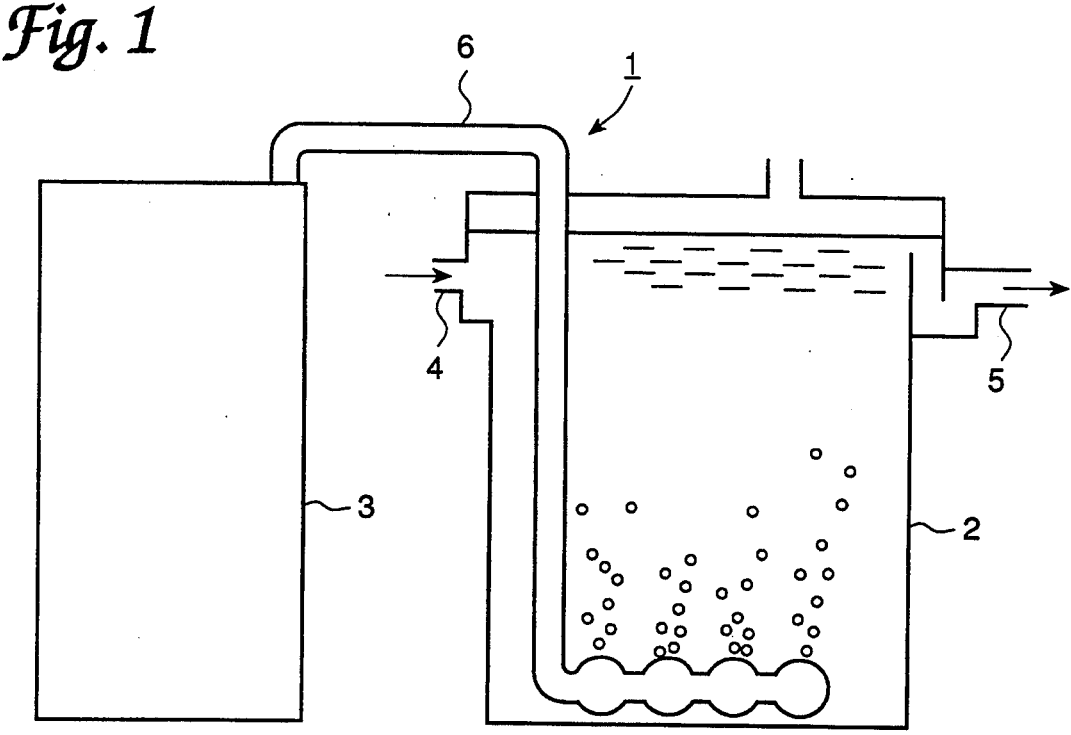
FIG. 1 is a surface modifying apparatus which can be used in the present invention.

According to the method of the present invention, a polyolefin resin molded article is brought into contact with an ozone aqueous solution at a prescribed temperature for a prescribed contact time. Through the ozone treatment, contaminants on the surface of the polyolefin resin molded article, such as organic substances, are decomposed. As a result, there is no need to previously clean the surface of the resin molded article with an organic solvent, etc. At the same time, the surface of the molded article is oxidized by the oxidizing power of ozone remaining in water and is thereby polarized. Whatever shape the resin molded article may have, the ozone aqueous solution surely reaches all over the surface of the resin molded article so that an oxidation reaction uniformly takes place on every part of the surface, hardly leaving marks due to reaction unevenness.

Taking the temperature of the ozone aqueous solution as T° C., and the contact time as C min., it is preferable that the product of T multiplied by C (T×C) is not less than 450 (particularly 700 to 1,700), provided that preferably C is 10 to 60 minutes. As the T value rises, the reactivity of the ozone aqueous solution becomes higher, though the ozone concentration tends to decrease. On the other hand, as the C value increases, the reacting weight increases. With the T×C value being 450 or higher, uniformity of the oxidation reaction is particularly secured, hardly causing marks due to reaction unevenness.

It is also preferable that the ozone aqueous solution has a temperature of 40° to 70° C. (particularly 45° to 65° C.) and a pH of not more than 7 (particularly 5 to 7). In this case, the ozone aqueous solution has enhanced reactivity to shorten the time required for the oxidation reaction. Moreover, since ozone in the aqueous solution is hardly decomposed under the acidic condition of pH of 7 or less, a high ozone concentration can be maintained thereby ensuring the reactivity.

According to the coating method of the present invention, a coating layer is directly formed on the surface of the thus obtained modified surface of a polyolefin resin molded article. Since the resin molded article has a uniformly oxidized and polarized surface, the coating layer provided thereon exhibits firm adhesion. If desired, a primer layer may be formed on the polyolefin resin molded article having the modified surface. The primer layer similarly exhibits firm adhesion to the modified surface of the polyolefin resin molded article without strictly selecting the primer material or giving any special manipulation in baking. A coating layer can be provided on the thus formed primer layer with good adhesion.

The present invention will now be illustrated in greater detail by way of Examples. Reference is made to FIGS. 1 to 5.

Example 1 and Comparative Example 1

Preparation of Polyolefin Resin Molded Article

A propylene homopolymer was molded into a hexahedral test piece of 90 mm long, 30 mm wide, and 3 mm thick.

Apparatus:

Surface modifying apparatus 1 shown in FIG. 1 is composed of stainless steel-made container 2 having inlet 4 and outlet 5 and ozone generator 3. Container 2 contains ultra-pure water. Fresh ultra-pure water is continuously fed to container 2 from inlet 4 at a rate of 1.5 l/min, and the waste water is discharged from outlet 5 at the same rate.

To ozone generator 3 is connected one end of hose 6 through which ozone generated in generator 3 is led to container 2, with the other end lying on the bottom of container 2. Ozone from generator 3 is bubbled into water in container 2, and part of it is dissolved in ultra-pure water.

Figure 2:
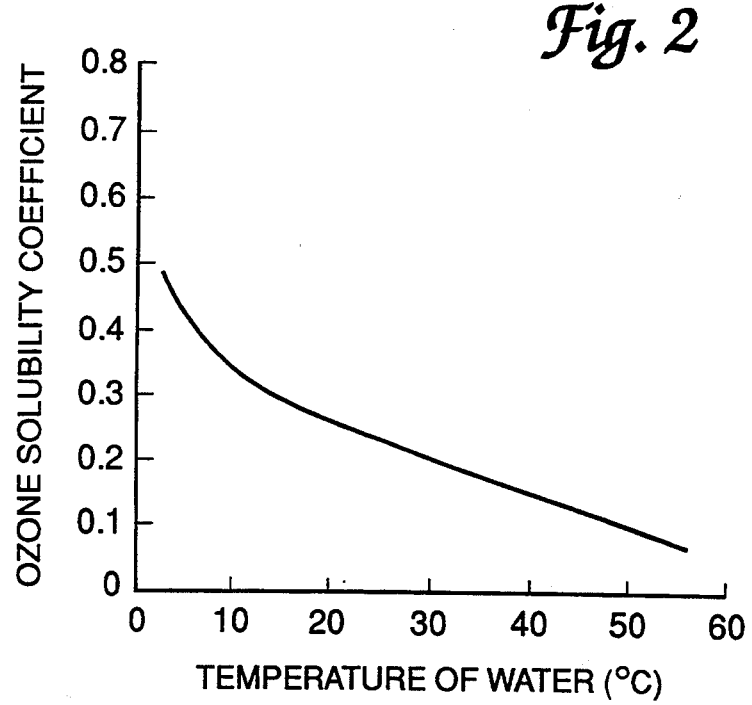
FIG. 2 is a graph of ozone solubility coefficient vs. temperature of water.

Container 2 is equipped with a thermostat (not shown) so that the temperature of ultra-pure water having dissolved therein ozone, i.e., an ozone aqueous solution, may be kept constant. In FIG. 2 is shown the relationship between temperature of water and solubility coefficient of ozone. As is seen, the higher the temperature, the less the solubility of ozone. On the contrary, it is well known that the rate of reaction increases according as the temperature of water rises.

Test A:

The test piece was immersed in an ozone aqueous solution kept at a varying temperature for a prescribed time as shown in Table 1 below.

TABLE 1

| Temp. of Ozone Aqueous Solution (°C.) | Ozone Concentration (mg/l) | Immersion Time (min) | | | | | |
|---|---|---|---|---|---|---|---|
| | | 2 | 5 | 10 | 30 | 60 | 300 |
| 25 | 11.4 | undone | undone | done | done | done | done |
| 45 | 8.8 | undone | done | done | done | undone | undone |
| 55 | 7.6 | done | done | done | done | undone | undone |

Figure 3:
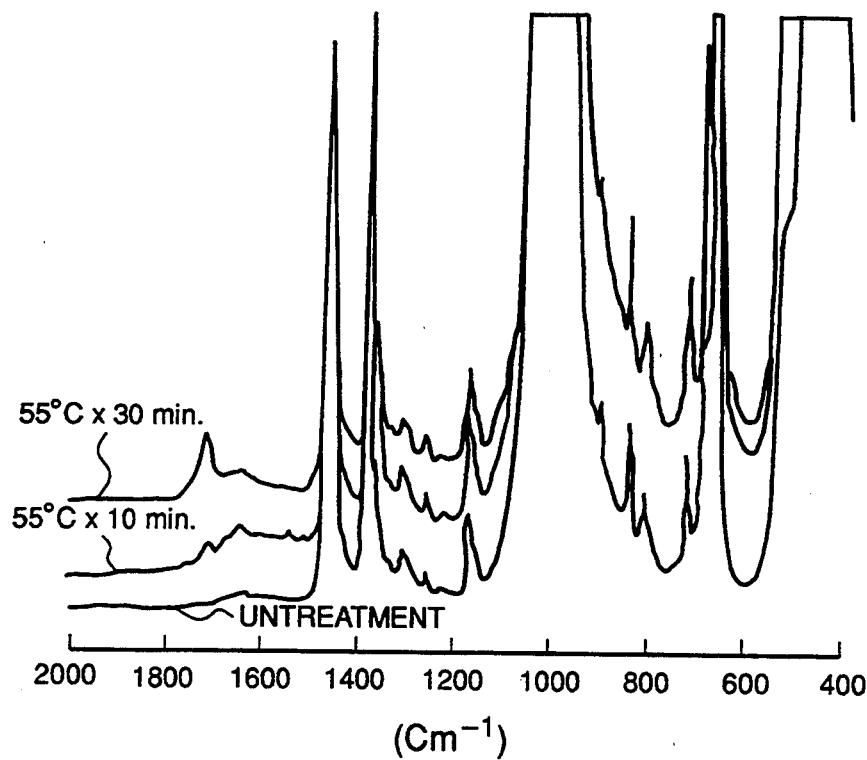
FIGS. 3 and 4 each show an FT-IR spectrum of the surface of a surface-modified test piece obtained in Example 1.
Figure 4:
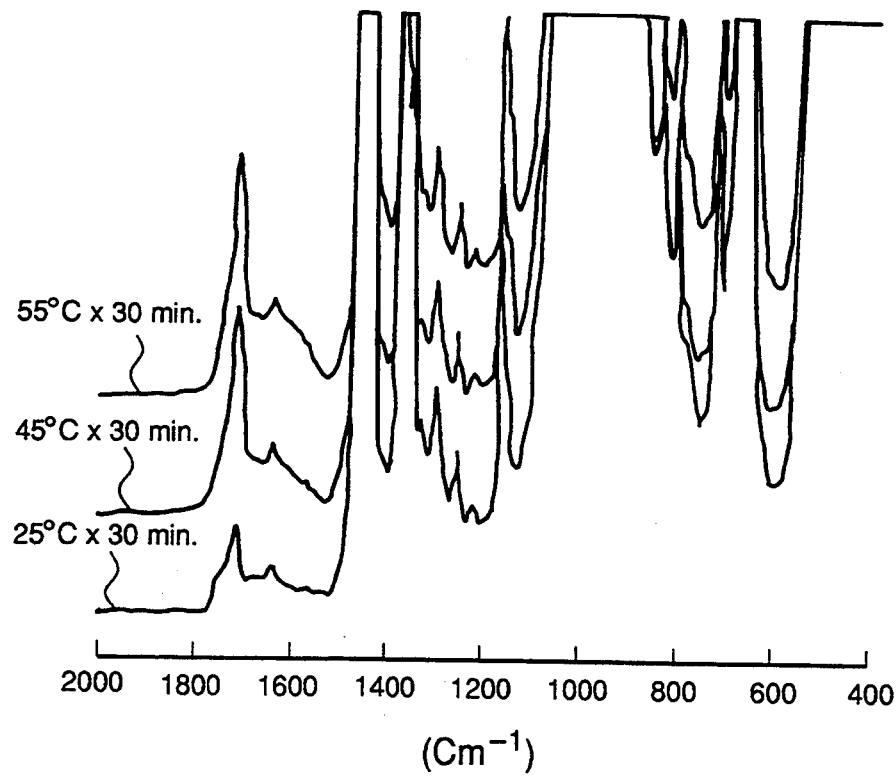

The thus treated test piece was subjected to FT-IR analysis to evaluate the degree of oxidation on the surface thereof. The measurement was made in a frequency region of from 400 to 2000 cm$^{-1}$ by means of "1760X" manufactured by Perkin-Elmer Co. The results obtained are shown in FIGS. 3 and 4.

The spectra of the treated test pieces each showed an absorption assigned to a carbonyl group at around 1713 cm$^{-1}$, indicating generation of a carbonyl group due to ozone oxidation of the surface of the polypropylene molded article. As is apparent from these spectra, with the temperature being equal, the longer the immersion time, the higher the rate of carbonyl group production. Further, with the immersion time being equal, the higher the temperature, the higher the rate of carbonyl group production.

Test B:

After the thus treated test piece was allowed to stand at room temperature for 48 hours, a urethane paint ("SFX 200" produced by Kansai Paint Co., Ltd.) was coated thereon as a topcoating paint to obtain a film thickness of about 100 μm, subjected to forced-drying at 85° C. for 40 minutes, and allowed to stand at room temperature for about 1 week. The peeling strength of the coating layer formed was measured with a tensile tester ("Tensilon") at a peel angle of 180° and a peel rate of 50 mm/sec. The results obtained are shown in Table 2 below.

TABLE 2

| Temp. of Ozone Aqueous Solution (°C.) | Peeling Strength (kgf/cm) | | | | | |
|---|---|---|---|---|---|---|
| | Immersion Time (min) | | | | | |
| | 2 | 5 | 10 | 30 | 60 | 300 |
| 25 | — | — | x | 0.47–1.07 | 1.16 | 1.13 |
| 45 | — | x | 0.84–1.16 | 0.99 | — | — |
| 55 | x | x | 0.40–0.96 | 0.97 | — | — |

Note: x indicates "unmeasurable" due to easy peel.

For comparison, an untreated test piece was coated according to a conventional technique as follows (Comparative Example 1: primer + topcoating paint).

An untreated test piece was cleaned with trichloroethane and coated with a primer ("TC Micron" produced by Cashew Co., Ltd.) to obtain a film thickness of about 15 μm. The test piece with the primer layer was further coated with the same urethane paint (i.e., topcoating paint) as used above to obtain a film thickness of about 100 μm, subjected to forced-drying at 85° C. for 40 minutes, and allowed to stand at room temperature for about 1 week. In this case (i.e., Comparative Example 1), the peeling strength was from 1.00 to 1.05 kgf/cm.

As is apparent from the results in Table 2 in view of the comparative results, a peeling strength equal to or even higher than that of Comparative Example 1, in which a primer coating is provided, can be obtained without using a primer by controlling the immersion time dependent on the temperature of the ozone aqueous solution. On the other hand, where the immersion time is insufficient in relation to the temperature of the ozone aqueous solution, it is seen that oxidation on the surface of the test piece does not proceed sufficiently only to achieve insufficient surface modification, resulting in extreme reduction in peeling strength of the coating layer.

It is also seen that a peeling strength reached in Example 1 involving no cleaning step is equal to or even higher than that of Comparative Example 1 in which the test piece was cleaned beforehand. It was thus proved that immersion in an ozone aqueous solution is effective to carry out not only oxidation but sufficient removal of organic substances on the surface of the test piece.

According to Example 1, contaminants on the surface of the polypropylene molded article, such as organic substances, are decomposed by contact with an ozone aqueous solution. Therefore, cleaning the surface of the resin molded article with an organic solvent which has conventionally been required as a step preceding surface modification can be omitted. As a result, surface modification can be achieved with reduced labor while preventing environmental pollution due to use of an organic solvent and reducing the cost incurred.

Further, the surface of the polypropylene molded article is oxidized by the oxidizing power of ozone remaining in water and thereby polarized. In carrying out the oxidation, no matter how complicated the shape of the article may be (the test piece of Example 1 was a hexahedron), all the surface of the molded article can be surely brought into contact with the ozone aqueous solution so that an oxidation reaction uniformly occurs on every part of the surface, hardly causing reaction unevenness. As a result, the surface can be modified easily and uniformly. A coating layer can be formed on the uniformly oxidized and polarized surface with good adhesion.

Example 2

Preparation of Polyolefin Resin Molded Article:

A propylene homopolymer was molded into a hexahedral test piece of 150 mm long, 110 mm wide, and 3 mm thick.

Apparatus:

The apparatus used in Example 2 is shown in FIG. 5. The apparatus comprises power washing apparatus 11, pure water washing apparatus 12 and drying oven 13 in addition to surface modifying apparatus 1 having the same structure as used in Example 1 except that the ozone aqueous solution contains an acid, e.g., sulfuric acid, so as to maintain the pH of the solution at a prescribed level.

Power washing apparatus 11 precedes surface modifying apparatus 1. Warm water (60° C.) is jetted from a jet nozzle (not shown) of power washing apparatus 11 at a pressure of 1 kg/cm$^2$. Pure washing apparatus 12 follows surface modifying apparatus 1. From a jet nozzle (not shown) of apparatus 12 is jetted pure water for washing the aqueous ozone solution off the treated test piece to prevent staining on subsequent drying. Drying oven 13 is used after washing with pure water for drying the surface of the surface-modified test piece.

Test C:

The above-prepared test piece was washed with warm water in power washing apparatus 11 and subjected to surface modification in surface modifying apparatus 1. The ozone aqueous solution in apparatus 1 had a concentration of 4 mg/l, a temperature of 50° C., and a pH of 5.5. The immersion time was 0 (untreated), 30 seconds, 2 minutes, 5 minutes or 10 minutes. The treated test piece was then washed in pure water washing apparatus 12 and dried in drying oven 13.

A primer ("EXP-4015" produced by Fujikura Kasei Co., Ltd.) was spray-coated on the surface of the test piece, and a topcoating paint ("SFX200" produced by Kansai Paint Co., Ltd.) was further spray-coated thereon. After drying at room temperature for 15 minutes, the coated film was baked at 80° C. for 30 minutes, followed by drying at room temperature for 7 days to form a primer layer having a thickness of 10 μm and a coating layer having a thickness of 30 μm.

The adhesion of the coated film was evaluated by cross cut test (according to JIS K5400). In this test, the coating layer was cross-hatched to make 100 squares, and an adhesive tape was adhered and then stripped off. The test was repeated 10 times on the same coating layer, and the number of squares peeled apart was counted. The results obtained are shown in Table 3, upper column. Further, the same cross cut test was conducted on the coated test piece having been immersed in water at 40° C. for 240 hours. The results obtained are also shown in Table 3, lower column.

TABLE 3

|  | Untreated | Treated (Immersion Time) | | | |
|---|---|---|---|---|---|
|  |  | 30 sec | 2 min | 5 min | 10 min |
| Before Immersion in Water | 1/100-5* | 0/500** | 0/500 | 0/500 | 0/500 |
| After Immersion in Water | 1/100-2*** | 0/500 | 0/500 | 0/500 | 0/500 |

Note:
*one out of 100 squares was peeled apart in the 5th test.
**No squares was peeled apart throughout the 5 tests.
***One out of 100 squares was peeled apart in the 2nd test.

As is shown in the upper column of Table 3, one of 100 squares of the coating layer provided on the untreated test piece was peeled off in the 5th stripping whereas the coating layer provided on the test piece having been treated with an ozone aqueous solution even for a relatively short immersion time as 30 seconds was not peeled, indicating strong adhesion of the coating film to the modified surface via the primer layer. Further, as shown in the lower column, when the coating layer was immersed in water at 40° C. for 240 hours, one of 100 squares of the coating layer on the untreated test piece was peeled in the 2nd test, whereas the coating layer on the test piece having been treated with an ozone aqueous solution even for a relatively short immersion time as 30 seconds was not peeled, indicating strong adhesion of the coating film to the modified surface via the primer layer even when subjected to a water resistance test. These results prove that a high adhesive strength of a coating layer can be obtained without need of strict selection of a primer material, that is, by using any of generally employed primers and also without need of any manipulation, for example, elevation of the baking temperature.

Test D:

The relationship between the temperature of an ozone aqueous solution and peeling strength was examined as follows. Surface modification with an ozone aqueous solution was carried out for 10 minutes or 20 minutes in the same manner as described above, except for varying the temperature of the ozone aqueous solution as shown in Table 4 below while fixing the pH at 6, and a coating layer were formed without a primer layer on the treated test piece in the same manner as described above. The peeling strength of the coating layer was determined, and the results obtained are shown in Table 4 together with the ozone concentration at the testing temperature.

TABLE 4

| Temperature (°C.) | Peeling Strength | | |
|---|---|---|---|
| | Ozone Concentration (mg/l) | Immersion Time | |
| | | 10 min (kgf/cm) | 20 min (kgf/cm) |
| 5 | 26 | 0.01 | 0.013 |
| 15 | 19 | 0.01 | 0.01 |
| 25 | 13 | 0.005 | 0.01 |
| 35 | 8.2 | 0.02 | 0.7 |
| 45 | 6 | 0.2 | 1.4 |
| 55 | 5.5 | 0.4 | 1.3 |
| 65 | 1.8 | 0.9 | 1.2 |

It is seen from Table 4 that the peeling strength markedly increases at temperatures higher than the middle between 35° C. and 45° C., i.e., 40° C., especially in the cases of the immersion time of 10 minutes. To the contrary, the peeling strength is reduced at temperatures of 35° C. and lower.

At a temperature higher than 65° C., while not shown, ozone is scarcely dissolved in water, failing to obtain desired effects of surface modification. Moreover, an ozone aqueous solution is difficult to handle under such a high temperature condition.

Test E:

The relationship between the pH of an ozone aqueous solution and adhesion of a coating layer (without a primer layer) was examined as follows. Adhesion of a coating layer was determined with the pH of an ozone aqueous solution being varied as shown in Table 5 below, the temperature of the ozone aqueous solution being fixed at 50° C., and the immersion time being 5 minutes, 10 minutes, 15 minutes or 20 minutes. The degree of adhesion was rated "A (good)", "B (slightly poor)", "C (poor)" or "D (no adhesion)". The results obtained are shown in Table 5 together with the ozone concentration at the varying pH. The ratios given in Table 5 indicate the area ratios of parts of the surface showing different degrees of adhesion.

TABLE 5

| pH | O₃ Concentration (mg/l) | 5 min | 10 min | 15 min | 20 min |
|---|---|---|---|---|---|
| 0.4 | 4.0 | D | D | D-50% B-50% | — |
| 2.0 | 3.8 | D | D-40% B-60% | D-50% B-50% | — |
| 4.0 | 3.2 | D | D | D-90% B-10% | — |
| 5.0 | 2.8 | C | B-80% A-20% | B-40% A-60% | — |
| 6.3 | 1.8 | D-80% B-20% | B-80% A-20% | D-10% B-90% | — |
| 7.2 | 1.1 | D-90% B-10% | D-80% B-20% | D-10% B-90% | — |
| 7.8 | 0.65 | C | D-60% B-40% | D-80% B-20% | D-50% B-50% |
| 8.3 | 0.45 | D | D | C | — |
| 8.5 | 0.40 | D | C | D | — |
| 8.7 | 0.20 | D | D | D-80% B-20% | — |
| 9.0 | 0.20 | D | C | C | — |
| 9.3 | 0.01 | D | D | D | — |
| 9.7 | 0.00 | D | D | D | — |
| 10.2 | 0.00 | D | D | D | — |
| 11.0 | 0.01 | D | D | D | — |

As is apparent from the results in Table 5, the effect of surface modification with an ozone aqueous solution is considerably reduced at a pH of higher than 7. Substantially no satisfactory adhesion was obtained at a pH of higher than 8. This seems to be because ozone in the aqueous solution is decomposed under an alkaline condition to seriously reduce the concentration. To the contrary, at a pH of not more than 7, a high ozone concentration can be maintained to provide satisfactory adhesion.

Thus, the same action and effect as observed in Example 1 could be obtained in Example 2. In addition, since a primer layer was provided between the modified surface and a coating layer, the contact time of the test piece with an ozone aqueous solution can be reduced as compared with Example 1 in which a coating layer was formed directly on the modified surface. In this case, too, a general-purpose primer may be employed, and no special manipulation, such as elevation of a baking temperature, is not needed.

With the temperature of an ozone aqueous solution falling within the range of from 40° to 70° C., a preferred ozone concentration can be maintained so that excellent reactivity can be assured. It follows that the surface of a resin molded article is modified satisfactorily; a coating layer can be formed thereon with high adhesion; and the treatment time can be shortened.

Further, with an ozone aqueous solution set under an acidic condition of pH of not more than 7, reduction in ozone concentration can be minimized to assure satisfactory reactivity of the ozone aqueous solution. The pH control combined with the above-mentioned temperature control makes surface modification satisfactory and assures high adhesion of a coating layer.

While the present invention has been described with reference to specific examples, the present invention is not construed as being limited thereto and may be carried out with some proper modifications without departing from the spirit and scope thereof. Illustrative examples of embodiments of such modifications are shown below.

(1) While in Examples 1 and 2 washing and surface modification were carried out in the same container (container 2 in FIG. 1), the surface modifying apparatus may be composed of two tanks, one for washing and the other for surface modification.

(2) While in Examples 1 and 2 ultra-pure water was used in container 2, pure water or tap water may also be employed.

(3) While in Example 1 washing and surface modification were carried out simultaneously by immersion in an ozone aqueous solution, washing may be performed by striking a water stream against the surface of a resin molded article.

(4) While in Examples 1 and 2 surface modification was carried out by immersing a resin molded article in an ozone aqueous solution, a jet stream, such as a shower, of an ozone aqueous solution may be applied to the surface of a resin molded article to obtain the same effect.

(5) While in Examples 1 and 2 a polypropylene resin molded article was subjected to surface modification, the present invention may be applied to a molded article of any other polyolefin resins, such as polyethylene. Further, the shape of the molded article is not limited to a hexahedron as used in Examples, and the present invention may be applied to a resin molded article of any other shapes.

(6) Container 2 of surface modifying apparatus 1 may be designed so as to generate ultrasonic waves by vibration. In this embodiment, surface modification and, in some cases, washing can be effected more rapidly by the physical contact effect.

As described and demonstrated above, the surface modification method and coating method according to the present invention make it possible to exclude use of an organic solvent for surface modification of a polyolefin resin molded article and to modify the surface of a polyolefin resin molded article easily and uniformly. By this surface modification, a coating film can be formed on a polyolefin resin molded article with high adhesion.

While the invention has been described in detail and with reference to specific embodiments thereof, it will be apparent to one skilled in the art that various changes and modifications can be made therein without departing from the spirit and scope thereof.

What is claimed is:

1. A method for modifying the surface of a polyolefin resin molded article which comprises contacting a polyolefin resin molded article with an ozone aqueous solution to oxidize the surface of said molded article.

2. A method as claimed in claim 1, wherein said contacting is carried out under such conditions that the product of the temperature of said ozone aqueous solution (T; °C.) multiplied by the contact time (C; min) (T×C) is not less than 450.

3. A method as claimed in claim 1, wherein said ozone aqueous solution has a temperature of 40° to 70° C. and a pH of not more than 7.

4. A method for coating the surface of a polyolefin resin molded article which comprises contacting a polyolefin resin molded article with an ozone aqueous solution to oxidize the surface of said molded article and then forming a coating layer directly on the thus surface-modified polyolefin resin molded article.

5. A method for coating the surface of a polyolefin resin molded article which comprises contacting a polyolefin resin molded article with an ozone aqueous solution to oxidize the surface of said molded article, forming a primer layer on the thus surface-modified polyolefin resin molded article, and then forming a coating layer on said primer layer.

* * * * *

UNITED STATES PATENT AND TRADEMARK OFFICE
CERTIFICATE OF CORRECTION

PATENT NO. : 5,378,768
DATED : Jan. 3, 1995
INVENTOR(S) : Ogisu, et al

It is certified that error appears in the above-indentified patent and that said Letters Patent is hereby corrected as shown below:

On title page, change

"[22]  Filed:  Dec. 29, 1993"

to

--[22]  Filed:  Dec. 28, 1993--.

Signed and Sealed this

Eighth Day of August, 1995

Attest:

BRUCE LEHMAN

Attesting Officer

Commissioner of Patents and Trademarks